(12) United States Patent
Garde (10) Patent No.: US 12,203,444 B2
(45) Date of Patent: Jan. 21, 2025

(54) RELATING TO THE TRANSPORTATION OF WIND TURBINE ROTOR HUBS

(71) Applicant: Vestas Wind Systems A/S, Aarhus (DK)

(72) Inventor: Erik Garde, Skødstrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 346 days.

(21) Appl. No.: 17/783,034

(22) PCT Filed: Nov. 25, 2020

(86) PCT No.: PCT/DK2020/050335
§ 371 (c)(1),
(2) Date: Jun. 7, 2022

(87) PCT Pub. No.: WO2021/121495
PCT Pub. Date: Jun. 24, 2021

(65) Prior Publication Data
US 2023/0011388 A1    Jan. 12, 2023

(30) Foreign Application Priority Data

Dec. 20, 2019   (DK) ............................ PA 2019 70820

(51) Int. Cl.
*F03D 13/40*   (2016.01)
*F03D 1/06*    (2006.01)

(52) U.S. Cl.
CPC ........... *F03D 13/40* (2016.05); *F03D 1/0691* (2013.01); *F05B 2260/02* (2013.01)

(58) Field of Classification Search
CPC ..... F03D 13/40; F03D 1/0691; F05B 2260/02
See application file for complete search history.

(56) References Cited

U.S. PATENT DOCUMENTS

| | | | |
|---|---|---|---|
| 8,398,373 B2* | 3/2013 | Matsuda | F03D 7/0224 416/156 |
| 8,430,639 B2* | 4/2013 | Numajiri | F03D 7/0224 416/155 |
| 9,803,620 B2* | 10/2017 | Garde | F03D 7/0224 |

(Continued)

FOREIGN PATENT DOCUMENTS

| CN | 101737251 A | 6/2010 |
|---|---|---|
| CN | 202228272 U | 5/2012 |

(Continued)

OTHER PUBLICATIONS

Danish Patent and Trademark Office, Search and Examination Report in PA 2019 70820, Jun. 8, 2020.

(Continued)

*Primary Examiner* — Justin D Seabe
(74) *Attorney, Agent, or Firm* — Wood Herron & Evans LLP (57) ABSTRACT

A rotor hub for a wind turbine which can be configured between an in use or 'operational' configuration and a transportation configuration. In the transportation configuration the rotor hub has a reduced external size compared to when it is in the operational configuration. The rotor hub comprises a generally hollow hub body having a first end and a second end spaced along a hub rotational axis, wherein the first end defines a rotor connection flange configured to connect the rotor hub to a main shaft, and wherein a second end defines a nose region of the hub. The hub also defines at least one blade aperture defined between the first end and the second end, a blade bearing associated with the or each blade aperture, and a pitch actuator associated with the blade bearing. In the operational configuration a portion of the pitch actuator protrudes from the nose region of the hub body by a first distance, whereas in the transport configuration the portion of the pitch actuator protrudes from the nose region of the hub body by a lesser extent than when in (Continued)

the operational configuration. Therefore it will be appreciated that the pitch actuator is energised to change the extent to which the pitch actuator protrudes through the nose region of the hub body.

16 Claims, 5 Drawing Sheets

(56) References Cited

U.S. PATENT DOCUMENTS

| | | | |
|---|---|---|---|
| 10,018,178 B2 * | 7/2018 | Fernandez Falces | ........................ F03D 7/0224 |
| 11,187,206 B2 * | 11/2021 | Garde | ................... F03D 1/0691 |
| 11,208,983 B2 * | 12/2021 | Kabus | ................... F03D 7/0224 |
| 2010/0316499 A1 | 12/2010 | Numajiri | |
| 2012/0063901 A1 | 3/2012 | Matsuda et al. | |
| 2012/0134840 A1 | 5/2012 | Leland | |

FOREIGN PATENT DOCUMENTS

| | | |
|---|---|---|
| CN | 102562454 A | 7/2012 |
| CN | 105308314 A | 2/2016 |
| EP | 2746570 A1 | 6/2014 |
| EP | 2837820 A1 | 2/2015 |
| WO | 2009080047 A2 | 7/2009 |
| WO | 2012130240 A1 | 10/2012 |

OTHER PUBLICATIONS

European Patent Office, International Search Report and Written Opinion in PCT Application No. PCT/DK2020/050335, Feb. 25, 2021.

China National Intellectual Property Administration, office action issued in corresponding CN Application No. 202080086863.9, dated Apr. 20, 2024 (with English translation).

\* cited by examiner

RELATING TO THE TRANSPORTATION OF WIND TURBINE ROTOR HUBS

FIELD OF THE INVENTION

The invention relates to a scheme or apparatus for transporting an oversized rotor hub of a wind turbine generator in order to comply with transport restrictions.

BACKGROUND OF THE INVENTION

In a typical 'horizontal axis' wind turbine, a nacelle mounted on a tower supports a rotor that includes a rotor hub and a plurality of blades. Each blade is connected at its root end to the rotor hub via a blade or 'pitch' bearing. Pitch cylinders actuate the blade bearings to rotate or 'pitch' the blades about their axes. In some instances, the pitch cylinders protrude from the main body of the rotor hub.

Conditions encountered at a wind turbine construction site can be challenging and so onsite assembly procedures should be minimised. Therefore, the main components of a wind turbine, such as the rotor hub, are usually pre-assembled off site and transported to the construction site where the wind turbine is assembled as quickly as possible. Regulations and travel circumstances restrict the size of component that can be transported. As a result, large rotor hubs with protruding pitch cylinders can be at risk of infringing against certain transport restrictions.

It is against this background that the invention has been devised.

SUMMARY OF THE INVENTION

According to a first aspect of the invention there is provided a rotor hub for a wind turbine. The rotor hub can be configured between an in use or 'operational' configuration and a transportation configuration. In the transportation configuration the rotor hub has a reduced external size compared to when it is in the operational configuration. The rotor hub comprises a generally hollow hub body having a first end and a second end spaced along a hub rotational axis, wherein the first end defines a rotor connection flange configured to connect the rotor hub to a main shaft, and wherein a second end defines a nose region of the hub. The hub also defines at least one blade aperture defined between the first end and the second end, a blade bearing associated with the or each blade aperture, and a pitch actuator associated with the blade bearing. In the operational configuration a portion of the pitch actuator protrudes from the nose region of the hub body by a first distance, whereas in the transport configuration the portion of the pitch actuator protrudes from the nose region of the hub body by a lesser extent than when in the operational configuration.

In another aspect, the invention resides in a method of configuring a rotor hub for a wind turbine between a transport configuration and an operational configuration. The rotor hub includes a hub body, a blade bearing and a pitch actuator, wherein the hub body includes a nose region through which a mounting end of the pitch actuator is extendable. The method comprises locking the blade bearing and energising the pitch actuator so that the mounting end of the pitch actuator changes the extent to which it protrudes through the nose region of the hub body.

A benefit of the invention, therefore, is that the overall size of the hub body is reduced when it is in the transport configuration compared to when it is in the operational configuration. More specifically, it is the length dimension of the hub body that is reduced in the transport configuration due to the retraction of the actuators at least partially into the hub body. Even a small dimensional reduction may be useful to provide additional design flexibility for the rotor hub in order to maximise strength whilst keeping within transportation size limitations.

It should be noted that the use of the term 'operational configuration' does not require that the rotor hub is in use, or even mounted for use. Instead, it is to be interpreted in the sense that the hub body is in generally the same configuration as it would be when installed on a wind turbine during use, whether or not it is actually installed.

The amount/extent/length that the pitch actuator protrudes from the hub body may be fixed by a component of a known size. For example, in the operational configuration, a mounting end of the pitch actuator housing may be spaced from the nose region of the rotor hub by a removable spacer component. The size of the removable spacer component may define the size of the dimension reduction of the hub. The removable spacer component may be a single component that supports the mounting end of the pitch actuator. For example, it may extend about a cylindrical part of the pitch drive actuator and bear against an enlarged head or yoke that defines the mounting end of the pitch actuator.

In other embodiments, the removable spacer component may be defined by multiple parts or spacer sections that can be brought together and united around a portion of the pitch actuator to bear against and support its mounting end.

To ensure that the blade bearing does not move inadvertently during the re-configuration of the hub, the blade bearing may be placed into a locked state. Therefore, actuation of the pitch actuator has the effect of moving the pitch actuator mounting end with respect to the nose region of the hub, rather than moving the blade bearing.

In the method of the invention, the step of energising the pitch actuator may further include extending the pitch actuator to increase the extent to which the mounting end of the pitch actuator protrudes from the nose region of the hub body, thereby placing the rotor hub into the operational configuration. In this approach, the method may further include positioning a spacer component between the mounting end of the pitch actuator and the nose region of the hub body. After this step has been carried out, the mounting end of the pitch actuator may be secured to the nose region of the hub body via the spacer component. Configuring the rotor hub into the operational configuration may also include unlocking the blade bearing so that it can be driven to rotate by the pitch actuator.

Furthermore, the step of energising the pitch actuator may further include retracting the pitch actuator so to reduce the extent to which the mounting end of the pitch actuator protrudes from the nose region of the hub body, thereby placing the rotor hub into the transport configuration. Before the pitch actuator has been retracted, the method may include removing the spacer component from its position between the mounting end of the pitch actuator and the nose region of the hub body. After the pitch actuator has been retracted, the mounting end of the pitch actuator may then be secured to the nose region of the hub body.

Energisation of the pitch actuator may be achieved using an auxiliary control system. That is, the auxiliary control system is a system that is separate to the main hydraulic system in the hub which would usually power the pitch actuators during operation. Therefore, the main control system may be left unaffected by the operation of the auxiliary control system which may simplify the re-configuration of the hub between transport and operational configurations.

It will be appreciated that preferred and/or optional features of the first aspect of the invention may be combined with the other aspects of the invention. The invention in its various aspects is defined in the independent claims below and advantageous features are defined in the dependent claims below.

BRIEF DESCRIPTION OF THE DRAWINGS

The above and other aspects of the invention will now be described, by way of example only, with reference to the accompanying drawings, in which.

Note that features that are the same or similar in different drawings are denoted by like reference signs.

DETAILED DESCRIPTION OF EMBODIMENTS OF THE INVENTION

As described above, the invention relates to a scheme and an approach for configuring a wind turbine hub for transportation so that the dimensional envelope of the hub is reduced along at least one axis. In the known art, the external dimensions of the hub are fixed at the point of manufacture. In order to be transported to where the hub is to be installed, it must be loaded onto a trailer and transported at least some distance by road. Public roads generally have width restrictions to ensure the safety of other road users, and also height restrictions to ensure that loads are not compromised by low bridges, gantries and other cross-highway structures along the route. For this reason, therefore, those width and height restrictions are a constraint in the design and engineering of wind turbine hubs. The invention therefore provides a means by which the external dimensions of the hub can be reduced before it is transported, following which the hub can be re-configured into its in-use configuration.

Figure 1:
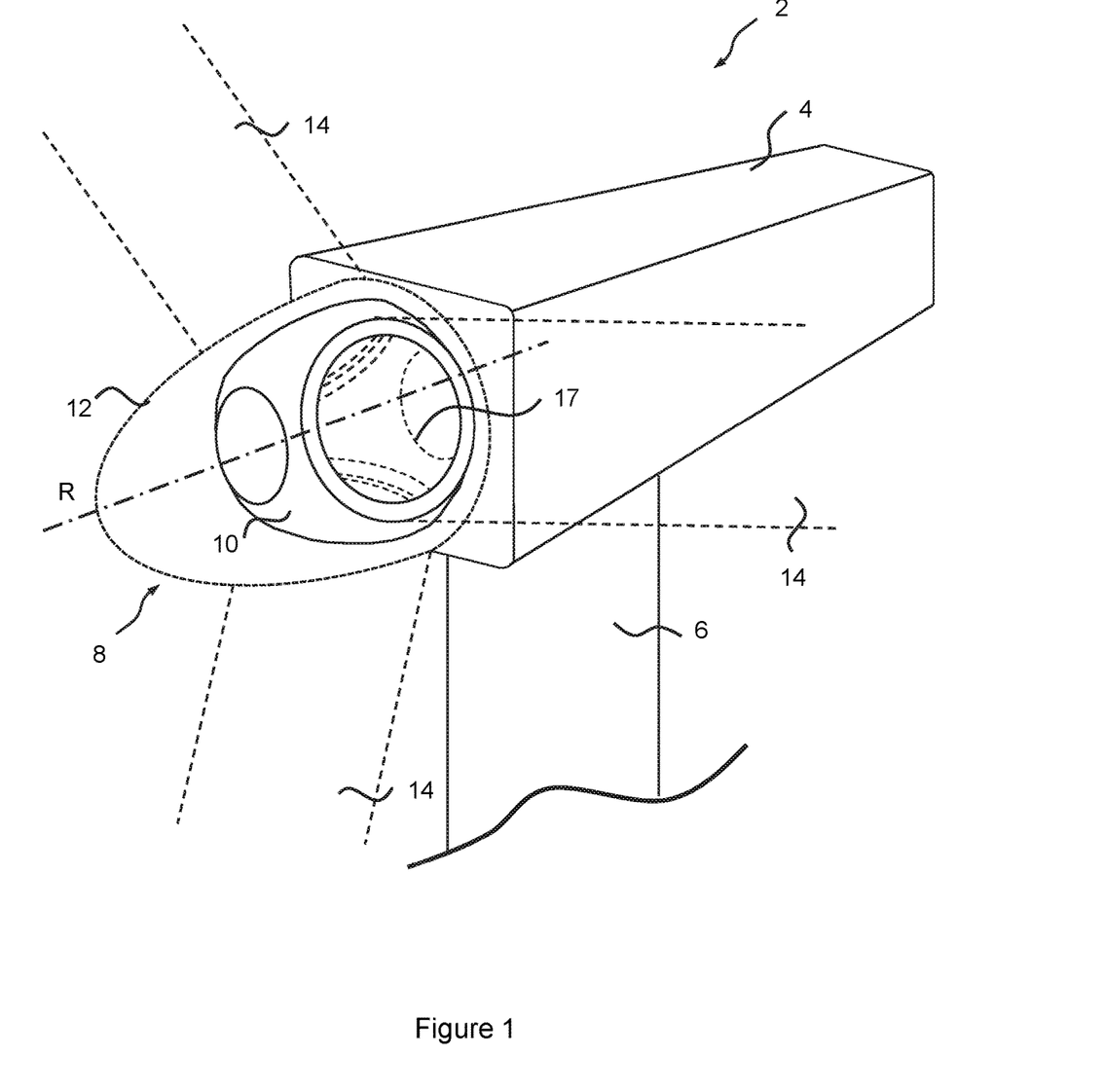
FIG. 1 is a front view of a horizontal axis wind turbine in which embodiments of the invention may be incorporated.

A typical horizontal axis wind turbine 2 is shown in FIG. 1 and comprises a nacelle 4 supported on top of a tower 6. FIG. 1 is a partial view since it only shows the upper end of the wind turbine. However, it would be understood that the tower would be mounted on a suitable foundation that is embedded in the ground, in the case of an on-shore wind turbine installation. For off-shore wind turbine installations, known gravity-based, monopile or jacket type foundations would be used, as would be well understood by the skilled person.

The nacelle 4 supports a rotor hub assembly 8 so that it is able to rotate with respect to the nacelle 4 about a rotational axis R. The rotor hub assembly 8 comprises a hub body or 'hub' 10 and a spinner cover 12 or more simply 'spinner' that serves as an aerodynamic fairing for the hub 10 in order to protect the components that are located within. The spinner 12 is shown here in ghosted form since it is not the primary focus of this discussion, so further description will focus on the hub 10 itself.

The hub 10 is the main mechanical component that provides the interface between a main shaft (not shown) within the nacelle 4 and a set of rotor blades 14. The hub 10 supports three rotor blades 14 in the illustrated embodiment so that they are able to rotate around the rotational axis R when driven by a flow of wind. A three-bladed configuration is typical in a modern-day horizontal axis wind turbine, although other numbers of blades are possible.

Figure 2:
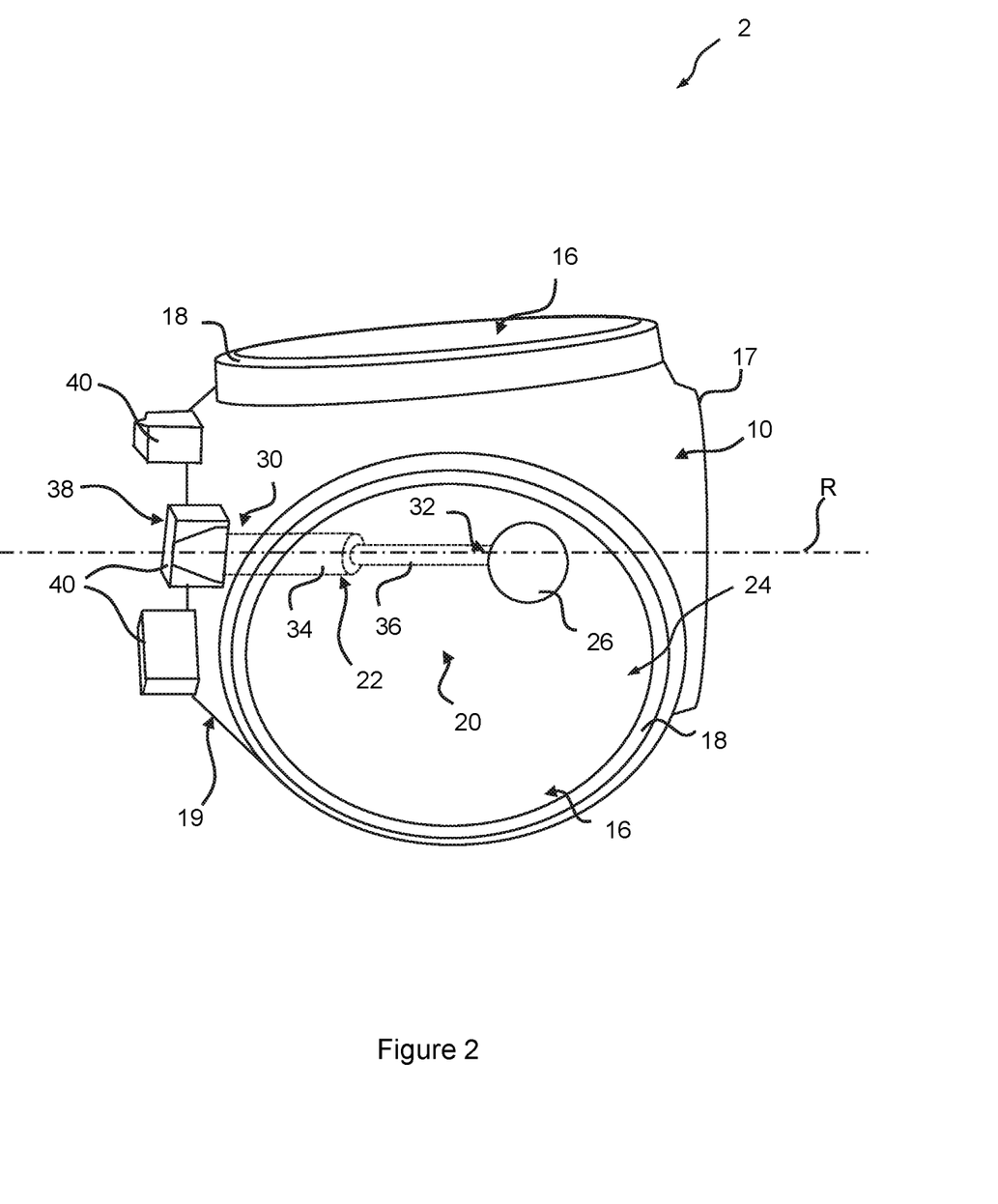
FIG. 2 is a perspective view of a hub and associated pitch system in accordance with an embodiment of the invention.

As discussed, FIG. 1 shows a generic form of wind turbine that provides suitable context for the discussion that now follows regarding the embodiments of the invention. FIG. 2 illustrates a hub 10 in accordance with an embodiment of the invention which is suitable for use on the wind turbine 2 as shown in FIG. 1.

The hub 10 includes three blade apertures 16 each of which supports a respective one of the blades 14. Note that only two of the three blade apertures 16 are shown in FIG. 2 due to the angle from which the hub 10 is viewed. Furthermore, the blades 14 are not shown but their presence is implied. The blade apertures 16 are spaced about the rotational axis R at equal angles. Each of the blade apertures 16 comprises a blade bearing 18. As is known, blade bearings 18 provide a rotational interface between a respective blade 14 and the hub 10 so that the blade is able to pitch about its spanwise or longitudinal axis. For clarity, the bolted connection between the blade and the blade bearing is not shown here. However, such a connection is conventional and not critical to the inventive concept as defined by the claims.

It will be appreciated that in FIG. 2 the hub 10 is oriented horizontally on the page such that a rotor connection flange 17 of the hub 10 is on the right, and a nose region 19 of the hub 10 is on the left. It will be appreciated that the nose region 19 is positioned at the front of the hub 10 when the hub is installed on a wind turbine, and is positioned opposite the rotor connection flange 17, when considered along the rotational axis R.

The hub 10 also includes a pitch system 20 which has the function of pitching blades about the longitudinal axis and so controlling their pitch angle. The pitch system 20 includes a set of linear actuators 22; at least one per blade. In the illustrated embodiment the linear actuators are hydraulic actuators and include a single linear actuator per blade. However, it is possible for more actuators to be provided for each blade.

FIG. 2 shows a single linear actuator 22 by way of example, but without complicating the drawing. The discussion will refer to the single actuator, although it will be appreciated that the same details will be present in the other linear actuators of the hub.

The linear actuator 22 is mounted to the hub 10 and connects to a pitch control linkage 24 associated with the respective blade. The pitch control linkage 24 may take various forms but in the illustrated example is a disc-shaped circular bulkhead that spans across the inner ring of the blade bearing 18. The linear actuator 22 couples to a radially offset joint 26 on the pitch control linkage 24 such that a force applied to the linkage causes the blade to pitch about its longitudinal axis. Note that the pitch control linkage 24 is shown here as being connected to or forming part of the blade bearing 18, although it should be appreciated that the pitch control linkage 24 could also be connected to the blade, or form part of it, and particularly the root end of the blade. The function of the pitch control linkage 24 is the same in both cases, however, which is to transfer a linear force from the actuator 22 to a torsional force applied to the blade.

The linear actuator 22 includes a mounting or 'coupling' end 30 and an actuating end 32. In the illustrated embodiment, the mounting end 30 is an end part of a cylinder or 'housing' 34 of the actuator, whilst the actuating end 32 comprises a push rod 36 which terminates at the radially offset joint 26. Therefore, the linear actuator in this embodiment is a conventional hydraulic actuator which has a cylinder which defines an internal barrel within which a piston is slidable in response to the differential pressure of a hydraulic fluid on either side of the piston. The piston is connected to a suitable actuating element such as a push rod such that movement of the piston results in extension and retraction of the push rod.

It should be mentioned at this point that conventionally hydraulic actuators are mounted by their cylinder component whilst the push rods or 'rams' are connected to the component which they are required to move. However, this does not exclude the actuators being mounted inversely such that the push rod is mounted to the hub and the cylinder is mounted to the pitch control linkage. The terms 'mounting end' and 'actuating end' should be interpreted accordingly.

In FIG. 2 it can be seen that the linear actuator 22 is arranged inside the generally hollow hub 10 so that a portion 38 of the linear actuator 22 protrudes from the nose region 19 of the hub 10. Arranging the linear actuator 22 in this way is advantageous since it means that a larger actuator can be used in order to provide a greater torque on the pitch control linkage 24, but without increasing the size of the hub. Since a larger actuator produces a greater torque on the pitch control linkage 24, this means that the pitch system is able to be coupled effectively to larger blades whilst maintaining pitch angular velocities. A drawback of this arrangement, however, is that the protruding portion 38 of the linear actuator increases the axial length of the hub 10.

Figure 3:
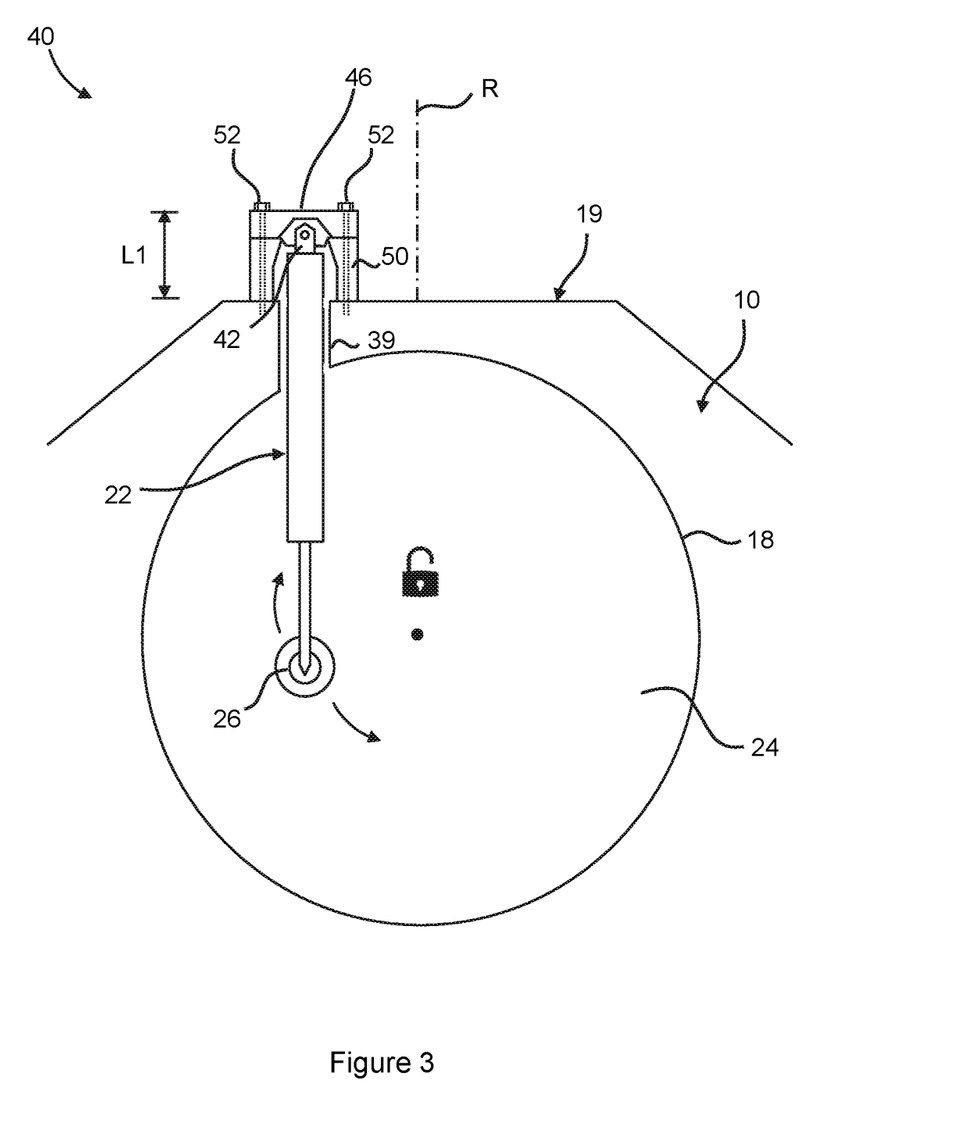
FIGS. 3, 4 and 5 are schematic views of the hub in FIG. 2 where the hub is being prepared for transportation.

FIG. 3 illustrates a schematic view of the hub in FIG. 2, and shows a mounting arrangement 40 for the linear actuator 22 which enables the linear actuator 22 to be moved in a direction towards and away from the nose region 19 of the hub 10. The direction of movement has a component aligned with the rotational axis R of the hub 10. This permitted movement allows the hub 10 to be switched between a transport configuration and an operational configuration. FIG. 3 is the first of three illustrations that show how the hub 10 is reconfigurable between the two configurations.

FIG. 3 itself shows the hub 10 in the operational configuration. Therefore, the linear actuator 22 is in the position it would be in during normal function of the wind turbine. In common with FIG. 2, the protruding portion 38 of the linear actuator 22 can be seen extending through an aperture 39 in the hub and beyond the nose region 19 of the hub 10 by a first distance. This is marked on FIG. 3 by the dimension L1. It should be noted that the dimension L1 is shown here as extending in the direction that is aligned with the rotational axis of the hub. However, the dimension L1 is present merely to indicate that the mounting end 30 of the pitch actuator is able to move away and towards the nose region 19 of the hub by a certain distance. It is not required that the pitch actuator is moveable in a direction that is parallel to the rotational axis of the hub.

As shown in the operational configuration of FIG. 3, the blade bearing 18 is unlocked, as depicted by the padlock symbol. Therefore, the linear actuator 22 is operable to extend and contract thereby acting on the pitch control linkage 24 to rotate the blade bearing accordingly. Note that details of a hydraulic pitch system to drive the actuator are not shown in FIGS. 3 to 5. However, the skilled person would understand that the pitch system includes a suitable control system, hydraulic in this case, which would provide suitable control inputs to the linear actuator 22 in order to cause it to extend and retract.

Remaining with FIG. 3, the mounting arrangement 40 supports the mounting end 30 of the linear actuator 22 beyond, that is to say outside of, the nose region 19 of the hub. In the illustrated embodiment, the mounting end 30 of the linear actuator 22 is depicted as including a bolted mounting bracket 42 that extends from a base 44 of the linear actuator 22. The mounting bracket 42 is received by and is bolted to a block-like mounting plate or 'yoke' 46 which is linear in form. The mounting bracket 42 bisects the length dimension of the yoke 46 so that the yoke 46 extends laterally with respect to the mounting bracket 42 for equal lengths each side of it. In effect, therefore, the yoke 46 defines the top bar of the 'T' with respect to the linear actuator 22.

Figure 4:
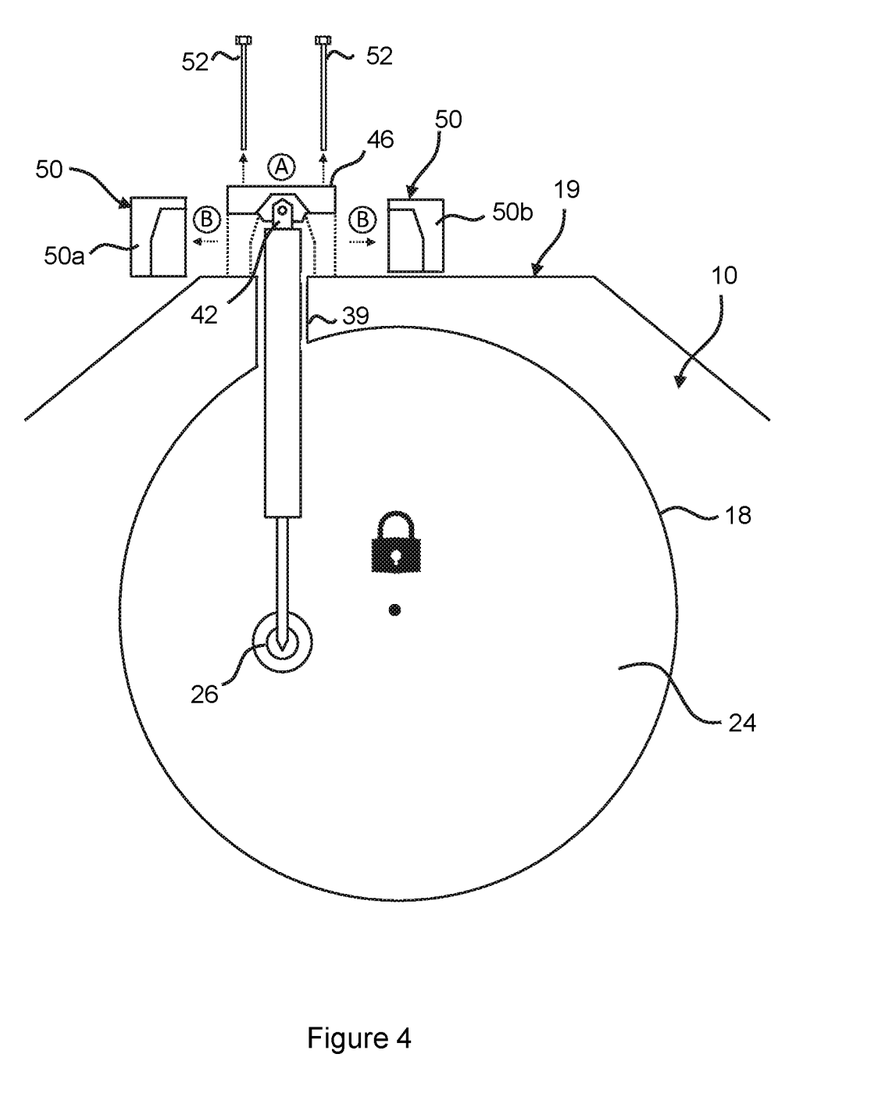
Figure 5:
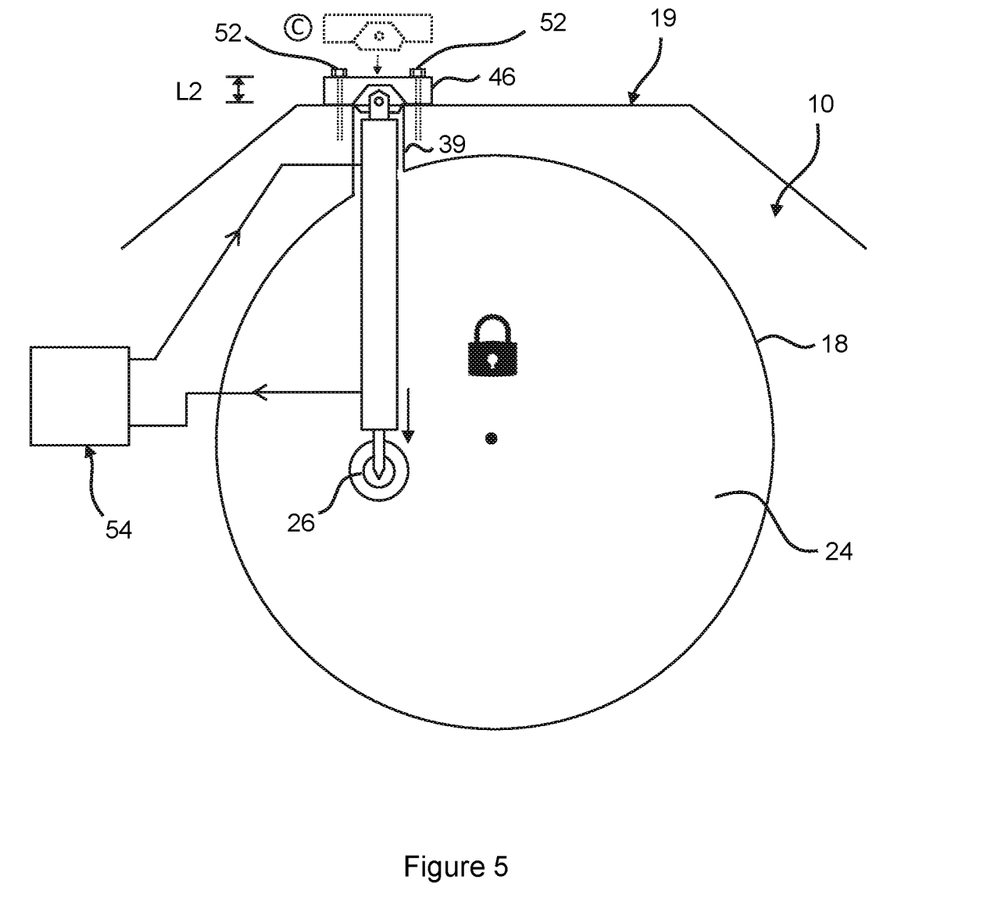

As will be apparent from FIGS. 4 and 5, the yoke 46 is able to be coupled directly to the nose region 19 of the hub 10. However, in FIG. 3 the yoke 46 is shown as being spaced away from the nose region 19 of the hub 10. In this connection, a spacer component 50 is positioned between the yoke 46 and the nose region 19 of the hub 10. As will become apparent, the spacer component 50 is removable, which is part of the process by which the hub 10 can be reconfigured between the operational configuration and the transport configuration.

The yoke 46 and the spacer component 50 are unified and secured to the nose region 19 of the hub 10 by a set of fasteners 52, here shown as bolts. Only a pair of bolts 52 are shown here, merely to illustrate the principle of connection. However, the skilled person would appreciate that what is required is for an appropriate fastening solution to secure the yoke 46 and the spacer component 50 to the hub 10.

FIG. 4 illustrates the first series of steps in order to place the hub 10 into a transport configuration. As can be seen, the blade bearing 18 is locked, as indicated by the padlock symbol. Locking of the blade bearing 18 may be achieved in various ways, which may include a hydraulic or electrically driven locking member, or simply a manually applied clamping device which can be applied to the blade bearing and tightened to ensure that the blade bearing 18 is unable to rotate.

Once the blade bearing 18 is locked, the bolts 52 are loosened and withdrawn from the spacer component 50 and the yoke 46. The yoke 46 remains attached to the mounting end 30 of the linear actuator 22 by virtue of the mounting bracket 42.

The spacer component 50 may take various forms, but it should be appreciated that its main function is to provide a predetermined offset distance between the yoke 46 and the nose region 19 of the hub 10. As shown here, the spacer component 50 comprises two sections or segments 50a, 50b which come together to embrace the mounting end 30 of the linear actuator and sit between the yoke 46 and the nose region 19. As such, the two segments 50a, 50b are withdrawn in opposite directions and it will be apparent that the two segment 50a, 50b are not connected together in this embodiment and so are separate to each other. As shown, the two segments 50a, 50b are moved in a direction that is substantially perpendicular to the major axis of the linear actuator 22. Alternatively, the spacer component 50 could be configured as a pair of segments as above, but which are hinged together in some manner, as a single component, or as more than two segments.

Turning to FIG. 5, the hub 10 can be seen in a transport configuration. Here, the spacer component 50 has been removed and the yoke 46 has been moved so that it now abuts against the nose region 19. In order to move the yoke 46, the linear actuator 46 is energised so it retracts or reduces in length. The blade bearing 18 is still locked, as depicted by the padlock symbol, so retraction of the linear actuator 22 causes the yoke 46 to be drawn towards the nose region 19 of the hub 10.

An actuator control system 54 is shown in FIG. 5, which is configured to control the movement of the linear actuator 22. The actuator control system 54 may be a different system to a main control system (not shown) that is housed in the hub. As such, the actuator control system 54 may be a dedicated auxiliary or 'secondary' control system with an on-board hydraulic supply, control interface and hydraulic connections sufficient to drive the linear actuator 22 through a relatively small range of movement. This simplifies the operation of the linear actuator as connection to the main control system is not required.

Once the linear actuator has been retracted sufficiently so that the yoke 46 abuts the nose region 19, the bolts 52 can be replaced into respective bolt holes in the yoke 46 and the hub 10 and tightened up to secure the yoke 46 appropriately. Note that the bolts 52 may be the same bolts that secured the yoke 46 and spacer component 50 to the hub or may be different bolts which are shorter, as shown in FIG. 5 as the increased length of the previous bolts may now not fit into the respective bolt holes.

The term 'retracted' as used here in connection with the movement of the linear actuator does not mean that the actuator is full retracted. Instead, it is mean that the actuator is retracted compared to the position of the actuator when the hub is in the operational configuration.

It will be appreciated that in the configuration shown in FIG. 5, the linear actuator 22 protrudes from the nose region 19 by a lesser extent than when the hub is in the operational configuration. This distance is shown on FIG. 5 as L2. Given the size of hubs on modern day utility scale wind turbines, it is envisaged that the length reduction may be in the region of 20 cm-70 cm or more. Note that, in the illustrated embodiment, when the linear actuator 22 is retracted a portion of it still protrudes from the hub 10. However, it is envisaged that in other embodiments the arrangement could be configured so that the actuator 22 could be withdrawn fully into the hub so that the actuator 22 does not protrude at all from the hub. In such a case, the actuator would still be considered to protrude from the hub 10 by a lesser extent that when the hub is in the operational configuration.

Once the hub is in the transport configuration, as shown in FIG. 5, it will be appreciated that it may then be placed back into the operational configuration by reversing the procedure described above.

Various modifications and adaptions may be made to the illustrated embodiments discussed above without departing from the invention, as defined by the claims. Some have already been mentioned, but others would be apparent to the skilled person.

LIST OF REFERENCE NUMERALS 2 wind turbine
4 nacelle
6 tower
8 rotor hub assembly
10 hub body/hub
12 spinner
14 blades
16 blade apertures
17 rotor connection flange
18 blade bearing
19 nose region
20 pitch system
22 linear actuator
24 pitch control linkage
26 radially offset joint
30 mounting end
32 actuating end
34 cylindrical housing
36 push rod
38 protruding portion
39 aperture in hub
40 mounting arrangement
42 mounting bracket
44 base of actuator
46 mounting yoke
50 spacer component
52 fasteners
54 actuator control system

The invention claimed is:

1. A rotor hub for a wind turbine, comprising:
a hollow hub body having a first end and a second end spaced along a hub rotational axis, wherein the first end defines a rotor connection flange configured to connect the rotor hub to a main shaft, and wherein a second end defines a nose region,
wherein the hub body also defines at least one blade aperture defined between the first end and the second end,
a blade bearing associated with the at least one blade aperture,
a pitch actuator configured to act on the blade bearing,
wherein the rotor hub includes a transport configuration and an operational configuration;
wherein in the operational configuration a portion of the pitch actuator protrudes from the nose region of the hub body by a first distance;
and wherein in the transport configuration the portion of the pitch actuator protrudes from the nose region of the hub body by a lesser extent than when in the operational configuration.

2. The rotor hub of claim 1, wherein, in the operational configuration, a mounting end of the pitch actuator is spaced from the nose region of the hub body by a removable spacer component.

3. The rotor hub of claim 2, wherein the removable spacer component comprises a plurality of spacer sections.

4. The rotor hub of claim 1, wherein the nose region includes a respective aperture through which the pitch actuator extends.

5. The rotor hub of claim 1, wherein, in the transport configuration, the blade bearing is in a locked state.

6. The rotor hub of claim 1, wherein, in the transport configuration, the pitch actuator is in a retracted state.

7. The rotor hub of claim 1, including an auxiliary system for energising the pitch actuator.

8. A wind turbine comprising the rotor hub according to claim 1.

9. A method of configuring a rotor hub for a wind turbine between a transport configuration and an operational configuration, the rotor hub comprising a hub body, a blade bearing and a pitch actuator, the hub body including a nose region through which a mounting end of the pitch actuator is extendable,
the method comprising:
locking the blade bearing and energising the pitch actuator so that the mounting end of the pitch actuator changes the extent to which it protrudes through the nose region.

10. The method of claim 9, wherein energising the pitch actuator further includes extending the pitch actuator to increase the extent to which the mounting end of the pitch actuator protrudes from the nose region of the hub body, thereby placing the rotor hub into the operational configuration.

11. The method of claim 10, wherein the method further includes, after the pitch actuator has been extended, positioning a spacer component between the mounting end of the pitch actuator and the nose region of the hub body, and securing the mounting end of the pitch actuator to the nose region of the hub body via the spacer component.

12. The method of claim 9, wherein energising the pitch actuator further includes retracting the pitch actuator so to reduce the extent to which the mounting end of the pitch actuator protrudes from the nose region of the hub body, thereby placing the rotor hub into the transport configuration.

13. The method of claim 12, wherein the method further includes, before the pitch actuator has been retracted, removing the spacer component from its position between the mounting end of the pitch actuator and the nose region of the hub body.

14. The method of claim 13, wherein, after the pitch actuator has been retracted, securing the mounting end of the pitch actuator to the nose region of the hub body.

15. The method of claim 9, wherein energising the pitch actuator comprises using an auxiliary control system.

16. The method of claim 9, wherein configuring the rotor hub into the operational configuration includes unlocking the blade bearing so that it can be driven to rotate by the pitch actuator.

* * * * *